Feb. 24, 1970   K. G. NIELSEN   3,496,976
POTATO MACHINE, PARTICULARLY A POTATO PEELING MACHINE
Filed Oct. 5, 1967

INVENTOR
Karl Georg Nielsen
BY Alvin Browdy
ATTORNEY

United States Patent Office 3,496,976
Patented Feb. 24, 1970

3,496,976
POTATO MACHINE, PARTICULARLY A POTATO PEELING MACHINE
Karl Georg Nielsen, Dalmosevej 3,
Copenhagen, Denmark
Filed Oct. 5, 1967, Ser. No. 673,050
Int. Cl. A23n 7/02
U.S. Cl. 146—50      1 Claim

ABSTRACT OF THE DISCLOSURE

A potato peeling machine is provided having a rotating disc with an opening in the central part thereof and provided with oblique blades which in the vertical direction extend lower into the container than the disc.

---

The present invention relates to a peeling machine, and particularly to a potato peeling machine.

Machines of this kind are usually provided with a rotating disc having an abrasive surface on which are placed the raw potatoes. The said surface may be shaped as a grate iron or provided with an abrasive substance such as particles of flint stone. In this way the skin of the potatoes is removed, preferably under water spray which can be supplied from a supply of water at the bottom of the machine. The water from the said supply of water is sprinkled over the potatoes by means of blades fastened to the periphery of the disc. The disc can be rotated by means of a motor or through a gear by hand, and it is mounted on a vertical shaft in a container which preferably also is provided with an inner abrasive surface.

Such machines have found a wide spread use in restaurant kitchens, but are seldom used in household kitchens, as they are considered too expensive in view of the effect.

The object of the invention is to provide a potato peeling machine with a better efficiency.

Further, this efficiency is not obtained by an increased supplied effect, it is, on the contrary, the object of the invention to obtain better results with a lower effect supplied to the machine, preferably so low that it is possible to drive the machine manually.

The potato peeling machine according to the invention is characterized by the disc having ridges extending essentially helically from the periphery towards the centre.

As a result of this construction the potatoes are not only carried away from the periphery of the disc where they normally tend to stay but also that the peeling effect is increased. This is due to the fact that the potaoes are turned by the said ridges which can be, e.g., two in number and which may have a height of about a quarter of an inch, or be somewhat higher or somewhat lower.

According to the invention, the disc can be made in such a way that there is an opening in the central part thereof having oblique blades therein which extend in the vertical direction down into the container lower than the disc so that the water in the container can be flung upwardly without the disc lying in the water. This provides a lower resistance against the rotating of the disc, and, besides, the central water supply has shown to have a good effect.

Figure 1:
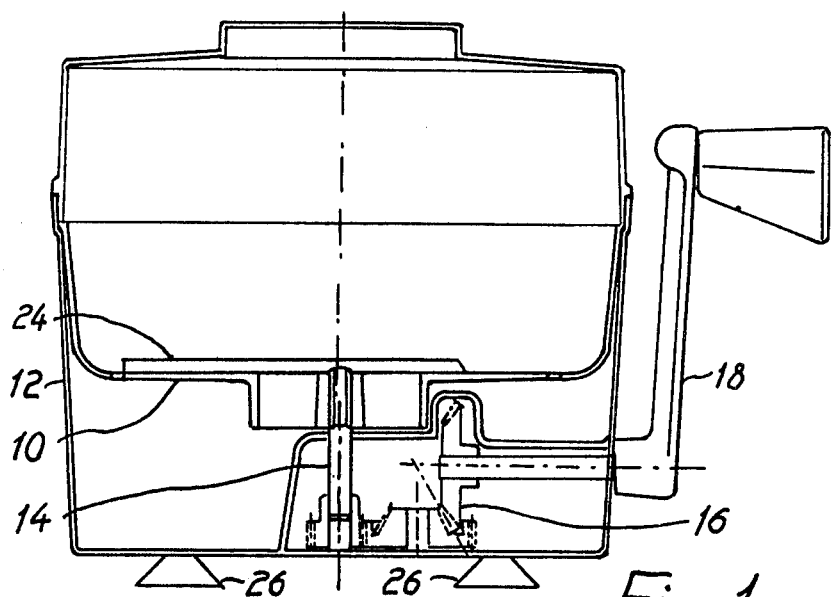
Figure 2:
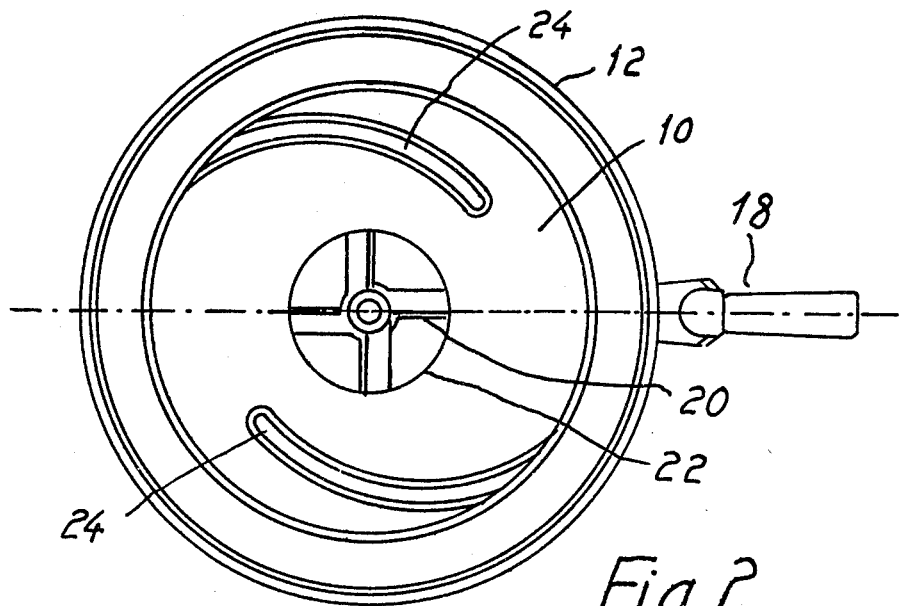

In the drawings:
FIG. 1 shows a schematic outline of the potato peeling machine according to the invention seen from the side, and
FIG. 2 the same seen from above.

In the preferred embodiment of the invention for household purposes the machine can contain about two pounds of raw potatoes. As mentioned above, the machine is provided with a disc 10 at the bottom of the container 12, and the machine is filled with water up to the underside of the disc 10. The disc 10 must be free of the water. The disc 10 is placed on a vertical shaft 14 which is driven from a gear box 16 provided with a handle 18. The disc is preferably made of plastic material and is provided with four oblique blades 20, e.g. of triangular shape in cross section, placed in the central opening 22 of the disc. The disc has on the upper side two ridges or embossments 24 extending up to 4 or 5 millimeters over the surface, which ridges have shearing edges e.g. in the form of particles of flint stone or the like partially embedded in the surface or in a layer on the surface. The ridges 24 extend from the periphery in an oblique, that is not radial, direction towards the central part of the disc.

On the inner side of the container there is a belt of abrasive material such as the same which is used on the disc.

It is possible, in a very short time, to remove most of the skin of the potatoes, so that only skin in recesses have to be removed manually. The time saved is so much that it is really an advantage to use the machine compared with manual peeling. The machine may be provided with sucking discs 26 so that it is easily placed on a kitchen table.

The cleaning of the machine is very simple as the water and the very small fragments of the skin can be removed when the disc, which is placed removably in the machine, is lifted up.

What I claim is:
1. In a potato peeling machine comprising a water carrying container, a horizontally disposed rotatable disc located above the water level, and means to rotate said disc, the improvements comprising:
  a pair of elongated ridges extending obliquely from the periphery of said disc toward the center thereof and projecting upwardly a distance on the order of about a quarter of an inch, said obliquely extending ridges comprising means to both increase the peeling effect and to carry potatoes from the periphery of said disc where they normally have a tendency to accumulate;
  said rotatable disc having an opening in the central part thereof coaxial with its axis of rotation, said rotatable disc being provided with generally radially extending blades in said opening, said blades extending downwardly to below the normal water level.

References Cited

UNITED STATES PATENTS 922,382    5/1909    Brenizer.
2,938,556  5/1960    De Mille _____ 146—50

W. GRAYDON ABERCROMBIE, Primary Examiner